United States Patent
Lai et al.

(10) Patent No.: US 8,209,485 B2
(45) Date of Patent: Jun. 26, 2012

(54) DIGITAL SIGNAL PROCESSING APPARATUS

(75) Inventors: Hung-Chi Lai, Kaohsiung (TW);
Ya-Hsin Hsiao, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 581 days.

(21) Appl. No.: 11/549,239

(22) Filed: Oct. 13, 2006

(65) Prior Publication Data
US 2007/0088773 A1    Apr. 19, 2007

(30) Foreign Application Priority Data
Oct. 19, 2005   (TW) ................................ 94136530 A

(51) Int. Cl.
*G06F 12/08*    (2006.01)
(52) U.S. Cl. ................................ 711/118; 711/E12.016
(58) Field of Classification Search ................. None
See application file for complete search history.

(56) References Cited

U.S. PATENT DOCUMENTS

| | | | | |
|---|---|---|---|---|
| 4,682,281 | A * | 7/1987 | Woffinden et al. ............ | 711/207 |
| 6,584,514 | B1 * | 6/2003 | Smith ............................. | 710/26 |
| 2004/0010639 | A1 * | 1/2004 | Inoue ............................ | 710/100 |
| 2005/0251624 | A1 * | 11/2005 | Brady et al. .................. | 711/122 |
| 2006/0010189 | A1 * | 1/2006 | Liao ............................. | 708/404 |

OTHER PUBLICATIONS

Jointly authored by Sung, et al., Article title "Design and Implementation of a Scalable Fast Fourier Transform Core", ASIC, 2002. Proceedings. 2002 IEEE Asia-Pacific Conference on, Aug. 6-8, 2002.
Jointly authored by Bevan M. Baas, Article title "A Low-Power, High-Performance, 1024-Point FFT Processor", IEEE . J. Solid-State Circuits, vol. 34, pp. 380-387, Mar. 1999.
Jointly authored by Lin, et al., Article title "A Dynamic Scaling FFT Processor for DVB-T Applications", IEEE J. Solid-State Circuits, vol. 39, pp. 2005-2013, Nov. 2004.

* cited by examiner

*Primary Examiner* — Edward Dudek, Jr.
*Assistant Examiner* — Ryan Dare
(74) *Attorney, Agent, or Firm* — J.C. Patents

(57) ABSTRACT

A digital signal processing apparatus comprises a main memory, a processing unit, a cache, and a rotate buffer unit. The main memory includes at least R memory banks for storing a plurality of data of digital signal. The cache is coupled between the main memory and the processing unit. The cache includes at least R×R cache units for storing part of data of the main memory to provide to the processing unit. The cache also temporarily stores operation results of the processing unit. The rotate buffer unit is coupled between the main memory and the cache for buffering and rotating the data outputted from each of the memory banks to write to the cache, and the data outputted from part of the cache units to write back to the corresponding memory banks respectively.

14 Claims, 16 Drawing Sheets

| Address | RAM-A | RAM-B | RAM-C | RAM-D |
|---------|-------|-------|-------|-------|
| 00 | 00 | 01 | 02 | 03 |
| 01 | 07 | 04 | 05 | 06 |
| 02 | 10 | 11 | 08 | 09 |
| 03 | 13 | 14 | 15 | 12 |
| 04 | 19 | 16 | 17 | 18 |
| 05 | 22 | 23 | 20 | 21 |
| 06 | 25 | 26 | 27 | 24 |
| 07 | 28 | 29 | 30 | 31 |
| 08 | 34 | 35 | 32 | 33 |
| 09 | 37 | 38 | 39 | 36 |
| 10 | 40 | 41 | 42 | 43 |
| 11 | 47 | 44 | 45 | 46 |
| 12 | 49 | 50 | 51 | 48 |
| 13 | 52 | 53 | 54 | 55 |
| 14 | 59 | 56 | 57 | 58 |
| 15 | 62 | 63 | 60 | 61 |

Stage 3, Stage 2, Stage 1

FIG. 2B (PRIOR ART)

| Address | MB1 | MB2 | MB3 | MB4 | MB5 | MB6 | MB7 | MB8 |
|---|---|---|---|---|---|---|---|---|
| 0 | 0 | 1 | 2 | 3 | 4 | 5 | 6 | 7 |
| 1 | 15 | 8 | 9 | 10 | 11 | 12 | 13 | 14 |
| 2 | 22 | 23 | 16 | 17 | 18 | 19 | 20 | 21 |
| 3 | 29 | 30 | 31 | 24 | 25 | 26 | 27 | 28 |
| 4 | 36 | 37 | 38 | 39 | 32 | 33 | 34 | 35 |
| 5 | 43 | 44 | 45 | 46 | 47 | 40 | 41 | 42 |
| 6 | 50 | 51 | 52 | 53 | 54 | 55 | 48 | 49 |
| 7 | 57 | 58 | 59 | 60 | 61 | 62 | 63 | 56 |
| 8 | 71 | 64 | 65 | 66 | 67 | 68 | 69 | 70 |
| 9 | 78 | 79 | 72 | 73 | 74 | 75 | 76 | 77 |
| 10 | 85 | 86 | 87 | 80 | 81 | 82 | 83 | 84 |
| 11 | 92 | 93 | 94 | 95 | 88 | 89 | 90 | 91 |
| 12 | 99 | 100 | 101 | 102 | 103 | 96 | 97 | 98 |
| 13 | 106 | 107 | 108 | 109 | 110 | 111 | 104 | 105 |
| 14 | 113 | 114 | 115 | 116 | 117 | 118 | 119 | 112 |
| 15 | 120 | 121 | 122 | 123 | 124 | 125 | 126 | 127 |

FIG. 8

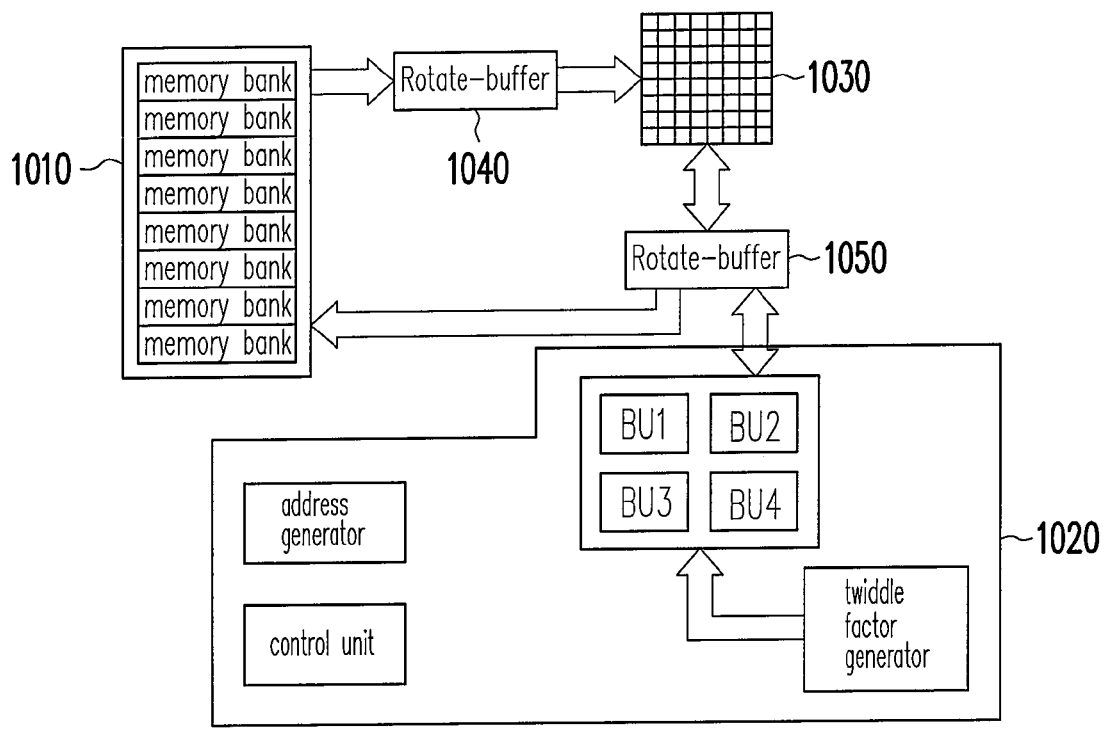
FIG. 10    1000
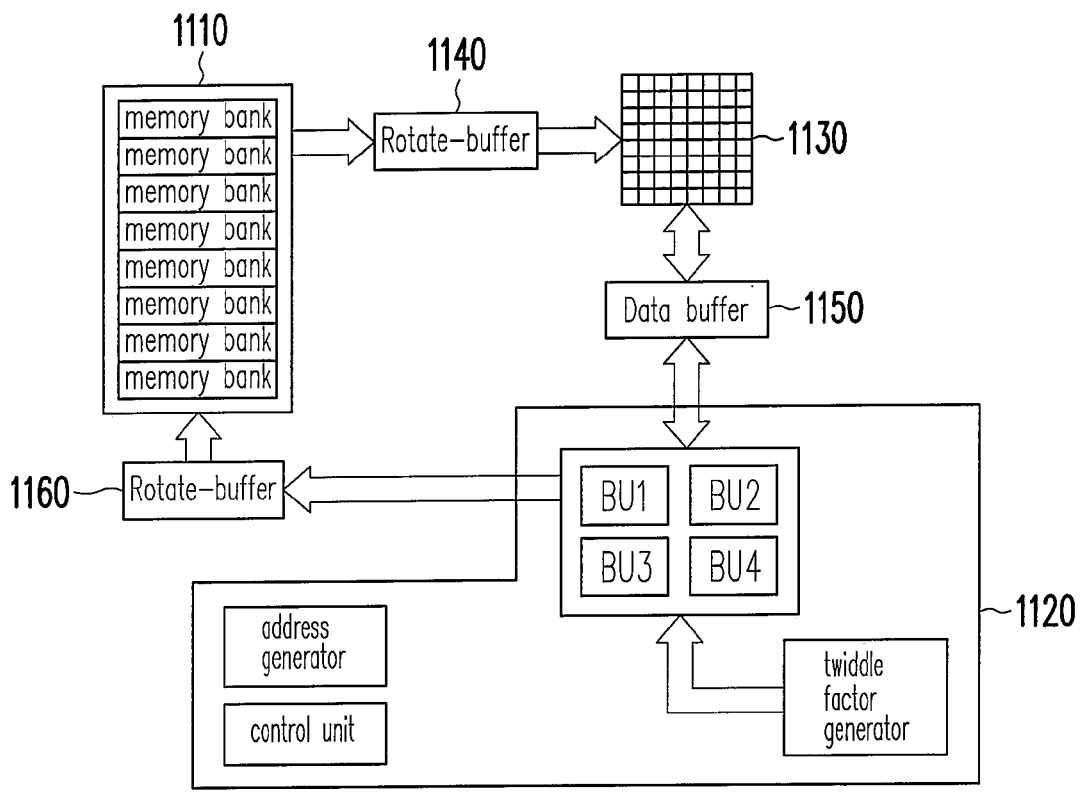
FIG. 11    1100

DIGITAL SIGNAL PROCESSING APPARATUS

CROSS-REFERENCE TO RELATED APPLICATION

This application claims the priority benefit of Taiwan application serial no. 94136530, filed on Oct. 19, 2005. All disclosure of the Taiwan application is incorporated herein by reference.

BACKGROUND OF THE INVENTION

1. Field of Invention

The present invention relates to a digital signal processing apparatus, and more particularly to a digital signal processing apparatus for implementing Fast Fourier Transformation (FFT) and Inverse Fast Fourier Transformation (IFFT).

2. Description of Related Art

The Orthogonal Frequency Division Multiplexing (OFDM) technique is generally used in wire and wireless communication systems (for example, ADSL, VDSL, IEEE 802.11a, HIPERLAN/2, DAB, and DVB-T). The processing device unit for performing Fast Fourier Transformation (FFT) and Inverse Fast Fourier Transformation (IFFT) operations is one of the important modules in the OFDM technique. Since a large amount of complex computations are required for FFT/IFFT (for example, DVB-T communication system requires an 8192-point FFT operation), it is suitable to implement with hardware.

There appear to be a great variety of different FFT algorithms, such as fixed-radix FFT (FRFFT) or split-radix FFT (SRFFT) algorithms. These algorithm's derivations all make the Discrete Fourier Transform (DFT) computations more efficiently. For split-radix FFT, it has the least computation complexity in traditional FFT algorithms. However the L-shaped structure would render it less suitable for implementation on digital signal processors. Unlike the irregular butterfly structure of SRFFT, FRFFT is simple to analyze and implement with hardware due to its structural regularity. Therefore, the FRFFT is by far more widely used although it involves more computations from the algorithm point of view. The digital signal processing architecture includes two types, a pipeline architecture and a single processing unit architecture. For very high-speed systems, a pipeline FFT configuration is required due to its high throughput rate. However, the pipeline architecture requires more hardware than the single processing unit architecture especially when applying the long-size FFT processing. Thus the manufacturing cost of the pipeline architecture increases. The single processing unit is the simplest memory-based architecture. It is an area-efficient, high performance and low-power architecture. However its controlling mechanism is rather complicated. From hardware design point of view, the single processing unit architecture is more reliable than pipeline structure to design a long-length FFT digital signal processing structure within standard latency-specified time.

FIG. 1A is the signal flow graph of a 16-ponit FFT algorithm. FIG. 1B is the architecture of a general single processing unit. In FIG. 1A, ⊕ and ⊗ represent complex addition and complex multiplication respectively. The input data for performing the FFT operation is required to be stored in a memory 110 previously. The basic computation performed at every stage is called a butterfly. It involves one complex multiplication and two complex additions. In stage S1, the processing unit 120 sequentially reads data pairs, such as [x(0), x(8)], [x(1), x(9)], [x(2), x(10)], ..., [x(7), x(15)], at a time from the memory 110. Then it performs the butterfly computations and returns the results to the same location in the memory 110. These computations are done in place. After it completes the butterfly operations in stage S1, the processing unit repeats the similar procedure of stage S2 except that the index distance of data pairs will be cut in half. It means that the processing unit sequentially performs butterfly operation for data pairs [x(0), x(4)], ..., [x(3), x(7)], [x(8), x(12)], ..., [x(11), x(15)]. For stage S3 and S4, it completes the processing in the similar way. Thus the 16-point FFT algorithm can be achieved using the single processing unit structure. The same method may be applied to FFT operations with variable data length which is power-of-2.

The First Conventional Art:

A digital signal processing architecture with two radix-2 FFT processing units and feedback paths is disclosed in *Design and implementation of a scalable fast Fourier transform core* (ASIC, 2002. Proceedings. 2002 IEEE Asia-Pacific Conference on, 6-8 Aug. 2002), as shown in FIG. 2A. In FIG. 2B, it describes the conflict-free memory addressing technique for the 64-point FFT algorithm. The data arrangement and the corresponding memory addresses form a circular symmetrical type. This allocation mechanism suits for arbitrary power-of-2 FFT algorithm, and no data-conflict would occur when it applies the single processing unit architecture.

Taking the 64-point FFT operation as an example. First, the input data must be stored into the memory banks according to the memory addressing technique shown in FIG. 2B. It uses the processing unit 220 to perform 4-point FFT operation at a time. Thus it requires 3-stage ($\log_4 64=3$) butterfly operations. In stage 1, the address generator 230 generates four addresses 00, 04, 08, 12 for memory banks RAM-A, RAM-B, RAM-C and RAM-D respectively. The kernel then reads data pairs [00, 16, 32, 48] from the memory at a time. It then executes two radix-2 butterfly computations, feedback the results to perform the second butterfly operation and in-place save the results. Repeating the above operations, the processing unit 220 sequentially reads data pairs [49, 01, 17, 33], [34, 50, 02, 18], ... [47, 63, 15, 31] from the memory banks RAM-A to RAM-D, and rotates the data sequences to [01, 17, 33, 49], [02, 18, 34, 50], ... [15, 31, 47, 63]. It then uses the two processing units to perform the butterfly operations of the first and second steps. Each time the butterfly operations of the two steps have been completed, the results are in-place written back to the memory banks RAM-A to RAM-D using the rotator.

Next in stage 2, similar operations are performed. The processing unit 220 sequentially reads data pairs [00, 04, 08, 12], ... [07, 11, 15, 03], [28, 16, 20, 24], ... [19, 23, 27, 31], [40, 44, 32, 36], ... [47, 35, 39, 43], [52, 56, 60, 48], ... [59, 63, 51, 55] from the memory banks RAM-A to RAM-D, and rotates the data sequences to [00, 04, 08, 12], ... [03, 07, 11, 15], [16, 20, 24, 28], ... [19, 23, 27, 31], [32, 36, 40, 44], ... [35, 39, 43, 47], [48, 52, 56, 60], ... [51, 55, 59, 63]. It then uses two processing units to perform the butterfly operations of the third and fourth steps. Each time the butterfly operations of the two steps have been completed, the results are in-place written back to the memory banks RAM-A to RAM-D using the rotator.

Finally, in Stage 3, similar operations are repeated. The processing unit 220 sequentially reads data pairs [00, 01, 02, 03], [07, 04, 05, 06], ... [62, 63, 60, 61] from the memory banks RAM-A to RAM-D, and rotates the data sequences to [00, 01, 02, 03], [04, 05, 06, 07], ... [60, 61, 62, 63]. It then uses two processing units to perform the butterfly operations of the fifth and sixth steps. Each time the butterfly operations of two steps have been completed, the results are in-place written back to the memory banks RAM-A to RAM-D using the rotator. Until then, the 64-point FFT operation has been completed.

The Second Conventional Art:

In *A low-power, high performance, 1024-point FFT processor* (IEEE J. Solid State Circuits, vol. 34, pp. 380-387, March 1999), a cache is added between the FFT processing unit and the main memory, as shown in FIG. 3. A main memory 310 is used to store the input data for FFT operation. A cache includes a 0th group of caches (cache unit 0A and cache unit 0B) and a 1st group of caches (cache unit 1A and cache unit 1B). Supposing each of them has a storage capacity of 8 data, that is, 8 data can be read at a time, such that a processing unit 320 is viewed as a radix-8 processing unit. When the 0th group of caches has already loaded 8 data from the main memory 310, 4 data for each of the cache units 0A and 0B, and it then uses the processing unit 320 to perform the butterfly operation. The 1st group of caches begins to load the next 8 data from the main memory 310, 4 data for each of the cache units 1A and 1B. When the 1st group of caches begins to use the processing unit 320 to perform the butterfly operations, the 0th group of caches in-place writes the previous results back to the corresponding address of the main memory 310, and also loads the next 8 data from the main memory 310.

The Third Conventional Art:

A digital signal processing apparatus with fewer caches is disclosed in *A dynamic scaling FFT processor for DVB-T applications* (IEEE J. Solid-State Circuits, vol. 39, pp. 2005-2013, November 2004), as shown in FIG. 4. In FIG. 4, a processing unit 420 is used for performing a radix-8 butterfly operation, such that a main memory 410 has 8 memory banks correspondingly, and a cache 430 is a cache matrix with 8×8 cache units. FIG. 5 is the signal flow graph of a 64-point FFT algorithm with radix-8 butterfly operation. In FIG. 5, each radix-8 butterfly operation (indicated by the circle 500 in the figure, for example) is regarded as performing a three-stage ($log_2 8=3$) radix-2 butterfly operation. In such a digital signal processing apparatus, the cache 430 reads 64 data from the main memory 410 at a time, which will be sequentially written to the cache 430 in the column direction. After the cache 430 is fully occupied, 8 data are provided to the processing unit 420 each time along the column direction of the cache via a bus BUS for performing the radix-8 butterfly operation, and this procedure is repeated for 8 times. Then, the cache 430 is updated by the results via the bus BUS, that is, Stage 1 in FIG. 5. Then, in Stage 2, the cache 430 outputs the updated 64 data in 8 times along the row direction, and 8 data are provided to the processing unit 420 via the bus BUS at a time for the radix-8 butterfly operation, and then the results are written back to the main memory 410 via the bus BUS and a normalized unit 440. The cache 430 reads 64 data from the main memory 410 at a time for butterfly operation. Therefore, the processing unit 420 and the cache 430 can be regarded as a radix-64 butterfly operation processor.

FIG. 6A illustrates the sequence of data stored in the cache matrix with 8×8 cache units of the cache 430. Each circle in the figure indicates a cache unit, and the numeral in the circle indicates the order for inputting data in the signal flow graph. Referring to FIGS. 5 and 6A, in Stage 1, the cache 430 outputs the data to the processing unit 420 column by column. For example, the cache 430 outputs the 1st column (i.e., 0th to 7th data) to the processing unit 420 for the radix-8 butterfly operation as indicated by the circle 500, and so forth. Each time after one radix-8 butterfly operation has been completed, the processing unit 420 in-place writes the results back to the cache 430 so as to update the data stored in the cache 430.

FIG. 6B illustrates the sequence of data outputted from the cache matrix of the cache 430 in Stage 2. In Stage 2, the cache 430 outputs data to the processing unit 420 row by row. For example, the cache 430 outputs the 1st row (i.e., the 0th, 8th, 16th, 24th, 32nd, 40th, 48th, 56th data) to the processing unit 420 to perform the first radix-8 butterfly operation in Stage 2. After the operation has been completed, the processing unit 420 writes the results of that row back to the main memory 410 through the bus BUS via the normalized unit 440, and then the cache 430 outputs the 2nd row (i.e., the 1st, 9th, 17th, 25th, 33rd, 41st, 49th, 57th data) to the processing unit 420 to perform radix-8 butterfly operation in Stage 2, and so forth.

To process a large amount of points with FFT, the signal flow graph of the FFT is divided into many groups of data blocks with 64 points as a unit, and there are even-numbered and odd-numbered blocks with different reading/writing rules, so as to utilize the cache high efficiently; and the operating procedure is classified into three configures: the main memory writes the data to the cache; the cache and processing unit perform the butterfly operation upon the data; and the processing unit writes the results back to the main memory. When the main memory writes the data to the cache through the bus BUS, the even-numbered blocks are all sequentially written to the cache along the column direction in 8 steps (column 1, column 2, . . . column 8) with 8 data for each step, whereas the odd-numbered blocks are all sequentially written to the cache along the row direction in 8 steps (row 1, row 2, . . . row 8) with 8 data for each step. Then, the cache exchanges data with the processing unit through the bus BUS to perform the 2-stage operation (i.e., the row operation and the column operation). As for the data in the even-numbered blocks, the butterfly operation in the column direction (column 1, column 2, . . . column 8) is sequentially performed first, and then the butterfly operation in the row direction (row 1, row 2, . . . row 8) is performed; and as for the data in the odd-numbered blocks, the butterfly operation in the row direction (row 1, row 2, . . . row 8) is performed first, and then the butterfly operation in the column direction (column 1, column 2, . . . column 8) is performed. Similarly, after the butterfly operation of the second stage has been completed, the processing unit sequentially writes the results in the row direction of the even-numbered blocks back to the main memory via the bus BUS. Each time when the results of one row have been written back to the main memory, the main memory will simultaneously write 8 data of the next odd-numbered block to the cache of said row, until the cache is fully occupied by the data of the new odd-numbered blocks. As for the odd-numbered blocks, the processing unit sequentially writes the results in the column direction back to the main memory via the bus BUS. Each time when the results of one column have been written back to the main memory, the main memory will simultaneously write 8 data of the next even-numbered block to the cache of said column, until the cache is fully occupied by the data of the new even-numbered blocks. In actual operations, the column and row processing directions of the even-numbered and odd-numbered blocks of data may be opposite to the above.

In summary, there are at least a few disadvantages of the conventional arts:

In the above first conventional art, no caches are provided in the architecture, and the processing unit must frequently access data from the main memory. Upon frequently accessing the main memory, working efficiency will be reduced and power consumption will be increased.

In the above second conventional art, the data will be less frequently accessed between the processing unit and the main memory by adding caches, and thereby power consumption will be reduced. With two groups of caches, the parallelism of data processing will be further enhanced. However, more circuit area will be occupied and manufacturing costs will be increased. In addition, a complicated control mechanism is required to switch between the two groups of caches in a ping-pong model.

In the above third conventional art, the main memory writes blocks of data to the cache in the column or row direction; the processing unit carries out an alternating operation with 2 stages to the data in the cache; and then the results of the blocks are written back to the main memory along the row or column direction. As the butterfly operation of the block data is repeatedly used, only one group of caches is required, such that the power consumption of the third conventional art will be less than that of the second conventional art. As the processing unit 420, the cache 430, and the normalized unit 440 are all coupled to the same bus BUS, the routing complexity in physical manufacturing is significantly increased, and accordingly, manufacturing costs will also increase. Furthermore, since almost all the members are coupled to the same bus BUS, a more complicated control mechanism is required to control the bus BUS.

SUMMARY OF THE INVENTION

An object of the present invention is to provide a digital signal processing apparatus for a radix-R digital signal processing through a simple control mechanism and a single group of caches.

Another object of the present invention is to provide a structure of another digital signal processing apparatus to achieve the above objects.

Still another object of the present invention is to provide a structure of another digital signal processing apparatus, in which the processing unit writes the results back to the main memory directly without using a cache after an operation has been completed, thus promoting the operation efficiency, besides achieving the above objects.

Another object of the present invention is to provide a structure of the digital signal processing apparatus to achieve the above objects with a more simplified architecture.

Based on the above and other objects, a digital signal processing apparatus including a main memory, a processing unit, a cache, and a rotate buffer unit is provided. The main memory includes at least R memory banks for storing a plurality of data representing the digital signal, where R is an integer. The processing unit is a processor for data processing. The cache is coupled between the main memory and the processing unit. The cache includes at least R×R cache units for storing a part of the data of the main memory, so as to provide the data to the processing unit. The cache also temporarily stores the results of the processing unit. The rotate buffer unit is coupled between the main memory and the cache for buffering and rotating the data outputted from each memory bank so as to write them to the cache, and also buffering and rotating the data outputted from part of the cache units so as to write them back to the corresponding memory banks.

In another aspect, a digital signal processing apparatus including a main memory, a processing unit, a cache, a first rotate buffer, and a third rotate buffer is provided. The main memory includes at least R memory banks for storing a plurality of data representing the digital signal, where R is an integer. The processing unit is a processor for data processing. The cache is coupled between the main memory and the processing unit. The cache includes at least R×R cache units for storing a part of the data of the main memory, so as to provide the data to the processing unit. The cache also temporarily stores the results of the processing unit. The first rotate buffer is coupled between the main memory and the cache for buffering and rotating the data outputted from each memory bank, so as to write them to the cache. The third rotate buffer is coupled between the main memory and the cache, and between the processing unit and the cache. The third rotate buffer buffers and rotates the data outputted from part of the cache units, so as to write them back to the corresponding memory banks. Furthermore, the third rotate buffer temporarily stores the output of the cache to provide the data to the processing unit. The third rotate buffer also temporarily stores the results of the processing unit to in-place write them back to the cache.

A digital signal processing apparatus including a main memory, a processing unit, a cache, a first rotate buffer, and a fourth rotate buffer is provided. The main memory includes at least R memory banks for storing a plurality of data representing the digital signal, where R is an integer. The processing unit is a processor for data processing. The cache is coupled between the main memory and the processing unit. The cache includes at least R×R cache units for storing a part of the data of the main memory, so as to provide the data to the processing unit. The cache also temporarily stores the results of the processing unit. The first rotate buffer is coupled between the main memory and the cache for buffering and rotating the data outputted from each memory bank, so as to write them to the cache. The fourth rotate buffer is coupled between the main memory and the processing unit for buffering and rotating the results outputted from the processing unit, so as to write them back to the corresponding memory banks.

A digital signal processing apparatus including a main memory, a processing unit, a cache, and a rotate buffer is further provided. The main memory includes at least R memory banks for storing a plurality of data representing the digital signal, where R is an integer. The processing unit is a processor for data processing. The cache is coupled between the main memory and the processing unit. The cache includes at least R×R cache units for storing a part of the data of the main memory, so as to provide the data to the processing unit. The cache temporarily stores the results of the processing unit, and writes the data stored in each cache unit back to the corresponding memory banks. The rotate buffer is coupled between the processing unit and the cache for buffering and rotating the data outputted from part of the cache units, so as to provide the data to the processing unit. The rotate buffer is further used for buffering and rotating the results outputted from the processing unit, so as to write them back to the corresponding cache units.

The digital signal processing apparatus of the present invention employs an algorithm suitable for the radix-R FFT processing unit, R×R cache units, and R memory banks, with the rotate buffer disposed between the processing unit and the cache, between the cache and the main memory, and/or between the main memory and the processing unit, thus it is suitable for performing an FFT operation with variable power-of-2 lengths, and the calculation complexity is relatively low, and the processing time can meet the requirements of various communication standards. In addition, the routing complexity in physical manufacturing can be reduced due to the use of a rotate buffer in the present invention. Besides, the present invention also has many advantages, such as, lower power consumption, higher efficiency, and fewer caches.

In order to make the aforementioned and other objects, features, and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2B is a method for storing data in the memory of FIG. 2A.

FIG. 8 is a data structure of the memory banks of FIG. 7.

FIGS. 10-13 are other embodiments of the digital signal processing apparatus according to the present invention.

DESCRIPTION OF EMBODIMENTS

Figure 7:
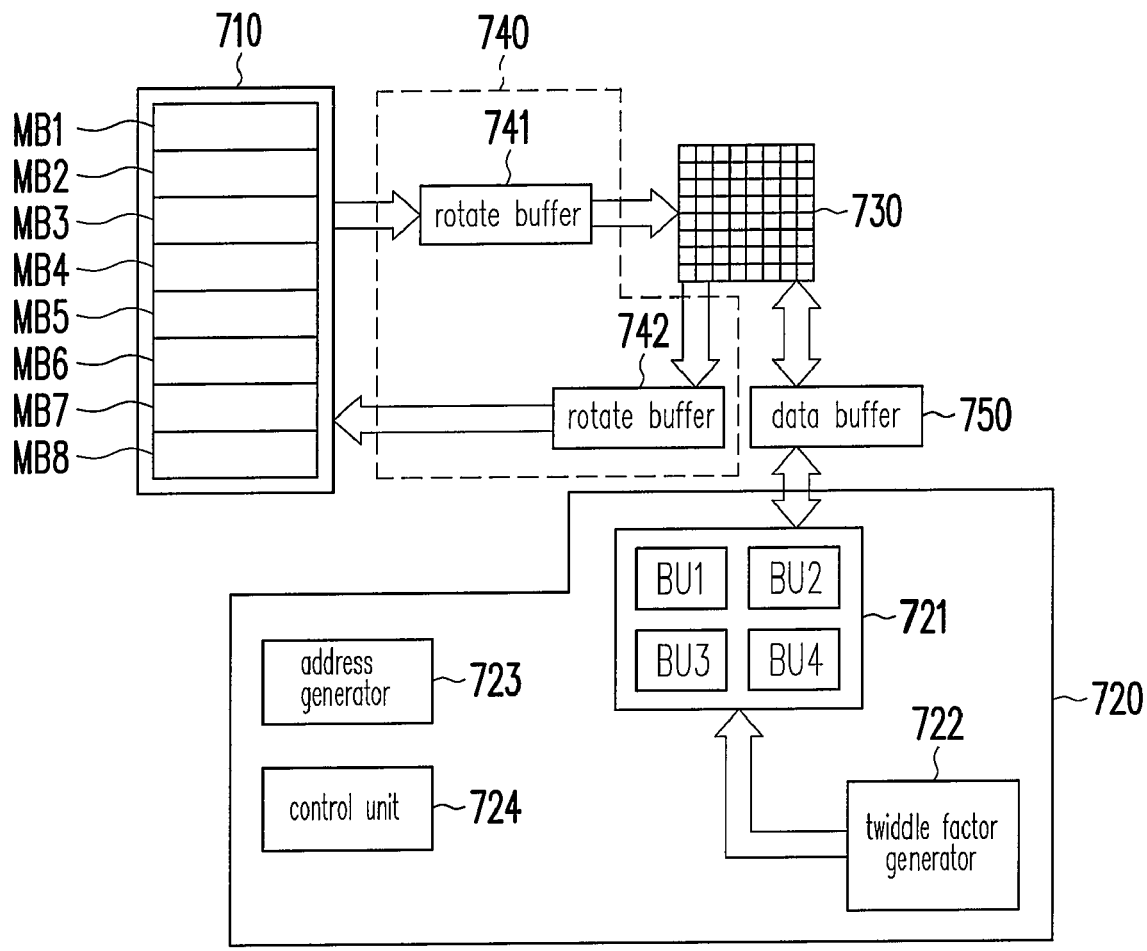
FIG. 7 is an exemplary embodiment of a digital signal processing apparatus according to the present invention.

FIG. 7 is an exemplary embodiment of a digital signal processing apparatus according to the present invention. Referring to FIG. 7, a digital signal processing apparatus 700 comprises a main memory 710, a processing unit 720, a cache 730, a rotate buffer unit 740, and a data buffer 750. To easily illustrate the present invention, the processing unit 720 is supposed to be a processor for a radix-8 FFT operation in this embodiment, the main memory should have at least 8 memory banks MB1 to MB8 for storing a plurality of data representing the digital signals. Those persons who implement the present invention should appreciate the processing of a radix-R (where R is an integer) digital signal through modifying the present invention according to the spirits of the present invention and the teaching of the following embodiments.

In this embodiment, the memory banks MB1 to MB8 may be either single-port memories or dual-port memories. The data allocation method of the memory banks MB1 to MB8 is not limited, and those skilled in the art may arbitrarily employ any data structure to meet their respective requirements. In this embodiment, the data allocation method disclosed in the above first conventional art is used (the allocation results shown in FIG. 8), and the detailed steps will not be described herein.

Figure 7A:
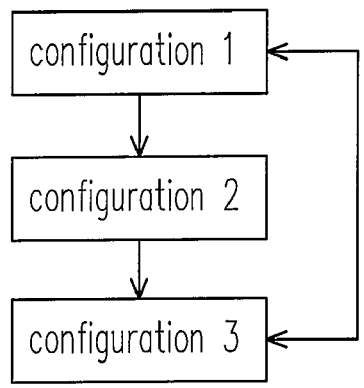
FIG. 7A is a time sequence of the operations of the main memory, the cache, and the processing unit according to the present invention.

First, the time sequence of the main memory 710, the cache 730, and the processing unit 720 is illustrated, as shown in FIG. 7A, which is divided into three configurations: configuration 1, configuration 2, and configuration 3. The configuration 1 indicates the main memory 710 sequentially writes the data to the cache 730 in the column or row direction; the configuration 2 indicates the data is accessed between the cache 730 and the processing unit 720; and the configuration 3 indicates that the cache 730 sequentially stores the operated data back to the main memory 710 in the row or column direction. Each time after the cache 730 writes a group of row data or column data back to the main memory, the main memory moves 8 data of the next data block to replace the data in the cache of said row or column, until the cache is fully occupied by new data blocks. This operation is used to enhance the data processing parallelism, thus, basically, within some time interval, the operations of the configuration 1 and the configuration 3 are overlapped. To easily illustrate the present invention, the overlapping circumstance is omitted in the following paragraphs, and the operating principle of the embodiments of the present invention is illustrated as being configured to operate sequentially.

FIG. 8 is the data structures of the memory banks MB1 to MB8 of FIG. 7. The numeral in the figure indicates the position of the input data in the signal flow graph for performing the FFT, and the data arrangements of the FFT with less than or equal to 128 points are included therein. The input data for the FFT operation are skillfully stored in the memory banks MB1 to MB8, such that each time when reading the desired data, the data can be read from the memory banks MB1 to MB8 simultaneously without any data conflicts.

Since the data in the memory banks are of a rotation arrangement as disclosed in the first conventional art, a rotate buffer 741 added in FIG. 7 anti-rotates the data written to the cache by the main memory, and a rotate buffer 742 rotates the results stored back to the main memory by the cache, so that the butterfly operation control, the address generation, the twiddle factor generation, and the entire control mechanism in the processing unit 720 can be simplified. In addition, the routing complexity can be focused between the rotate buffer and the cache by adding the rotate buffers 741 and 742, such that all related numerals among the main memory 710, the cache 730, and the processing unit 720 may be connected without using the bus BUS.

Still referring to FIG. 7, the rotate buffer unit 740 couples between the main memory 710 and the cache 730 for buffering and rotating the data output from the memory banks MB1 to MB8, so as to write them to the cache 730, and buffering and rotating the data output from part of the cache units in the cache 730, so as to write them back to corresponding memory banks MB1 to MB8. In this embodiment, the rotate buffer unit 740 includes a first rotate buffer 741 and a second rotate buffer 742. The first rotate buffer 741 is coupled between the main memory 710 and the cache 730 for performing the configuration 1, i.e., buffering and rotating the data output from the memory banks MB1 to MB8, so as to write them to the cache 730. The second rotate buffer 742 is coupled between the main memory 710 and the cache 730 for performing the configuration 3, i.e. buffering and rotating the data output from part of the cache units in the cache 730 so as to write them back to the corresponding memory banks MB1 to MB8. The first rotate buffer 741 and the second rotate buffer 742 rotate the data towards left direction and right direction respectively.

The cache is coupled between the main memory 710 and the processing unit 720. Since R is set to be 8 in this embodiment, the cache 730 should have at least 8×8 cache units so as to store part of the data of the main memory 710 to provide them to the processing unit 720. The cache 730 also temporarily stores the results of the processing unit 720. The data allocation method in each cache unit of the cache 730 is not limited, and those skilled in the art can arbitrarily employ any data structure to meet their respective requirements. In this embodiment, the data allocation method of the cache disclosed in the above third conventional art is used (the allocation results are shown in FIG. 6A).

Figure 6B:
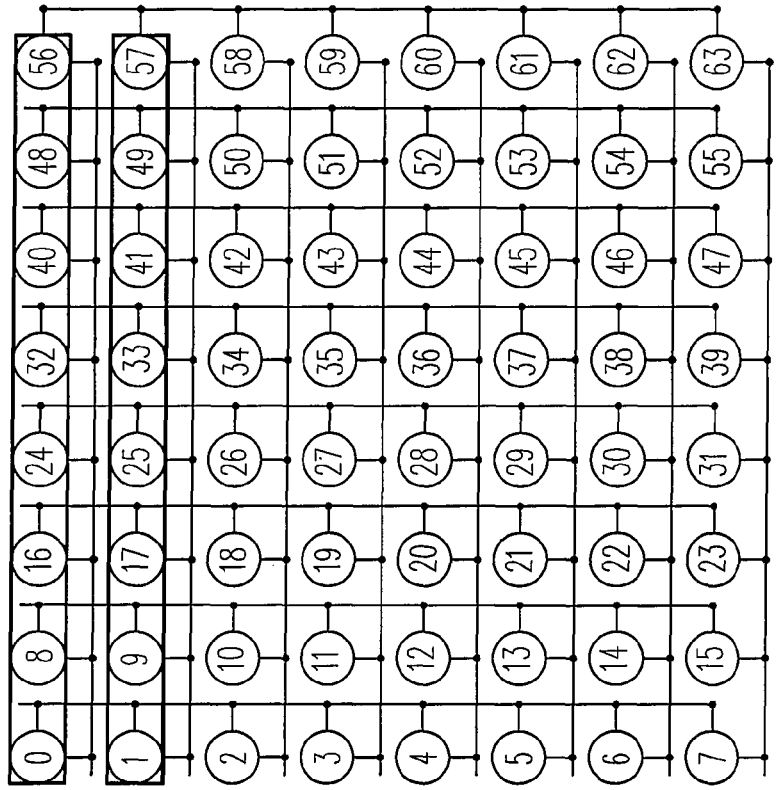
FIG. 6B is a sequence for outputting data from the cache matrix of the cache when the processing unit of FIG. 4 is performing Stage 2.
Figure 6A:
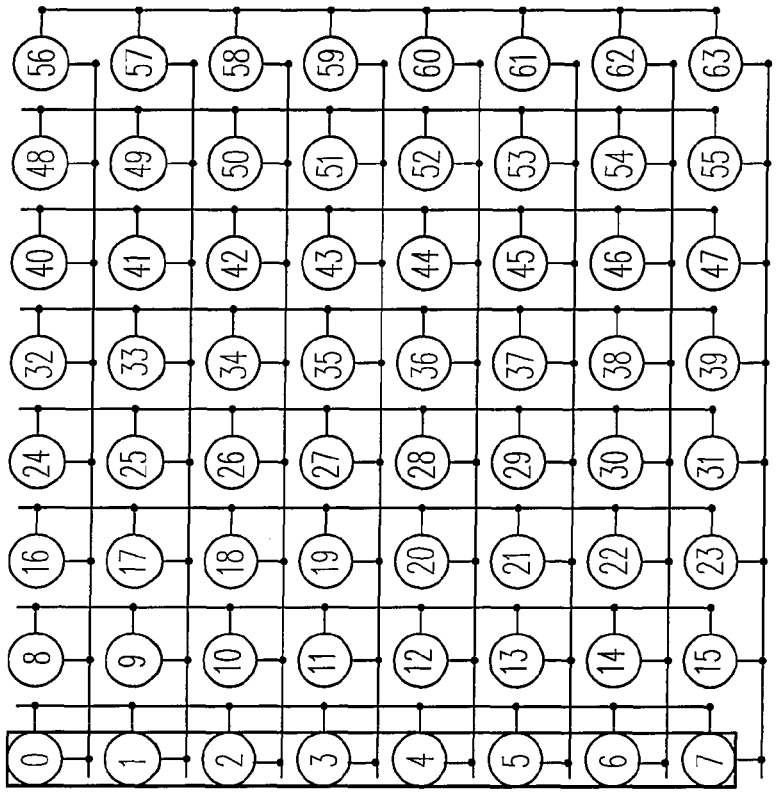
FIG. 6A is a sequence for storing data in a cache matrix with 8×8 cache units of the cache of FIG. 4.

For example, referring to FIGS. 7, 8, and 6A, with the controlling of a control unit 724 and the addressing of an address generator 723, the cache 730 reads the data 0, 1, . . . 7 at the address 0 from the memory banks MB1 to MB8 respectively via the rotate buffer 741, and stores them in the 1st column of cache units of the cache 730. And then, the rotate buffer 741 reads the next group of data 15, 8, 9, . . . 14 (address 1) from the memory banks MB1 to MB8 respectively, and rotates the data sequence to 8, 9, . . . 14, 15, and writes them to the cache 730. The cache 730 then stores the received data 8, 9, . . . 14, 15 in the 2nd column of cache units, and so forth. The operation of the configuration 1 will not completed, until the 64 cache units of the cache 730 have all been fully occupied by the data.

The data buffer 750 is coupled between the processing unit 720 and the cache 730 for buffering the output of the cache 730 to provide the data to the processing unit 720, and buffering the results of the processing unit 720 to write back to the corresponding places in the cache 730. The data buffer 750 can be omitted as appreciated by those skilled in the art, such that the processing unit 720 is directly coupled to the cache 730.

Figure 1A:
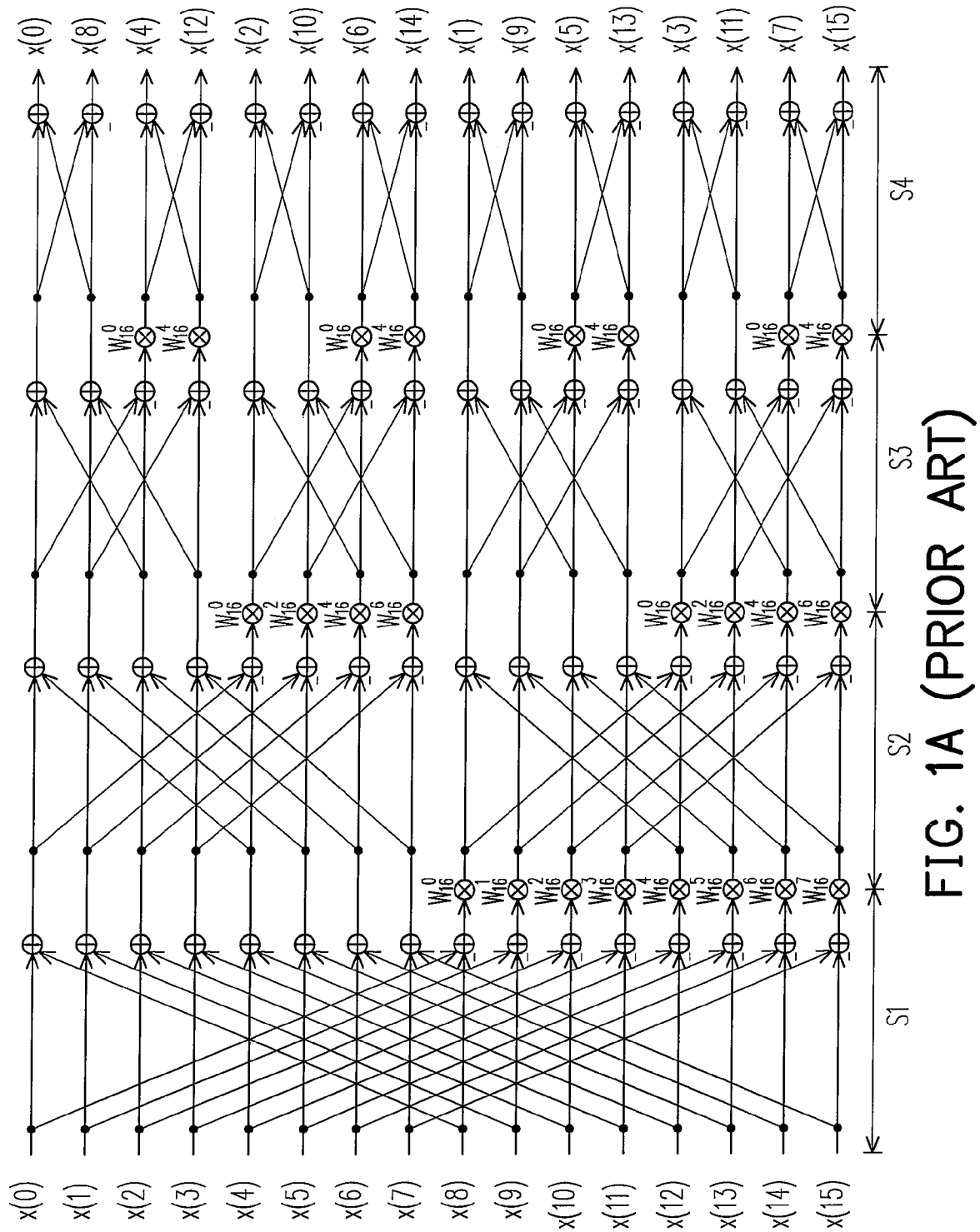
FIG. 1A is a signal flow graph of a 16-point Fast Fourier Transformation (FFT).
Figure 1B:
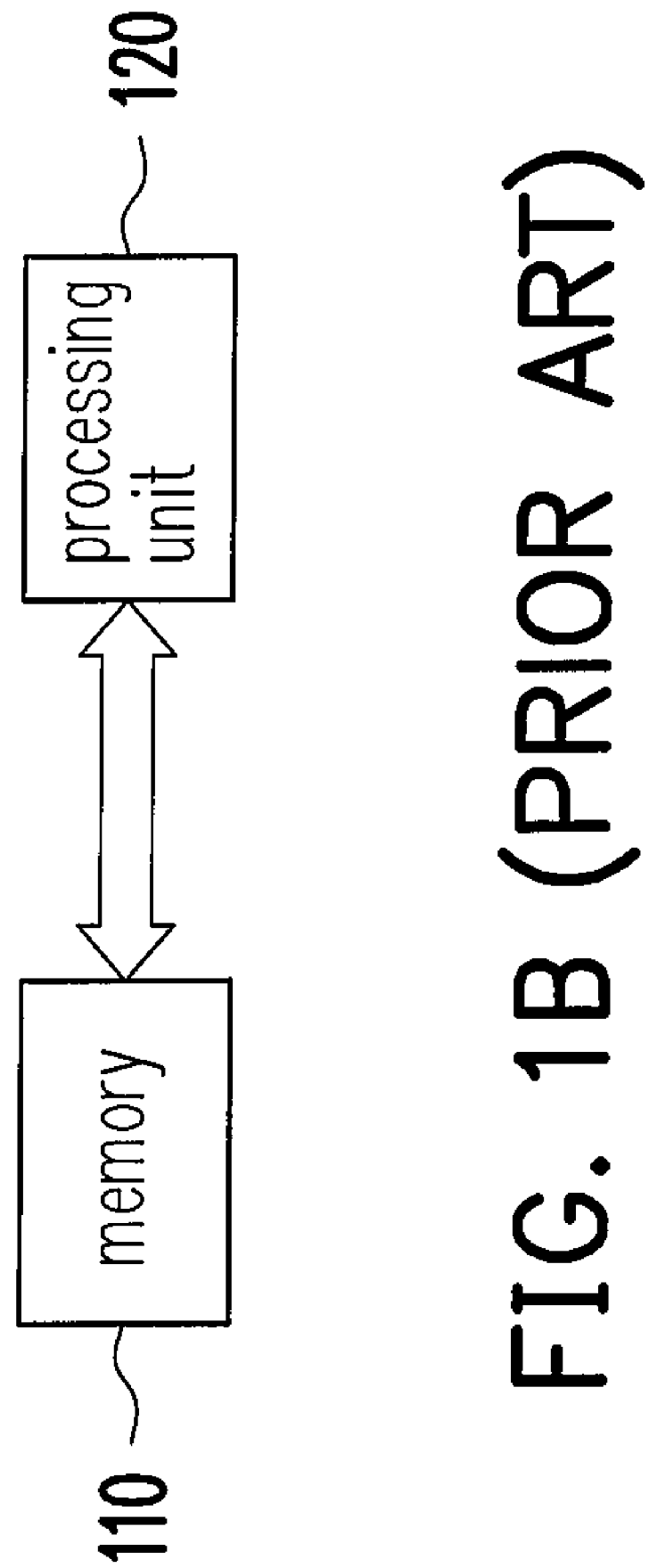
FIG. 1B is the architecture of a general single processing unit.
Figure 2A:
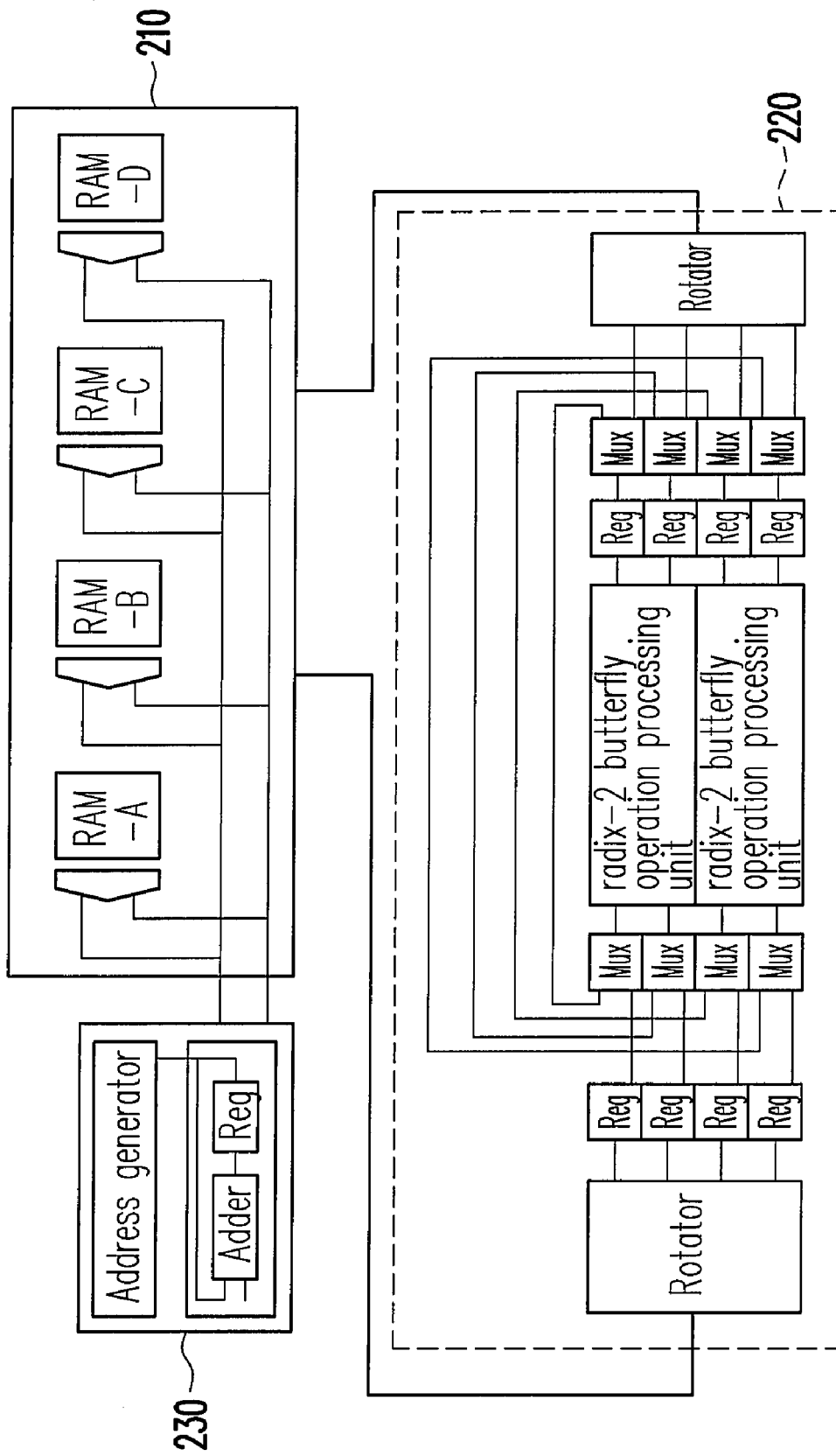
FIG. 2A is a conventional digital signal processing architecture with two radix-2 FFT processing units and feedback paths.
Figure 3:
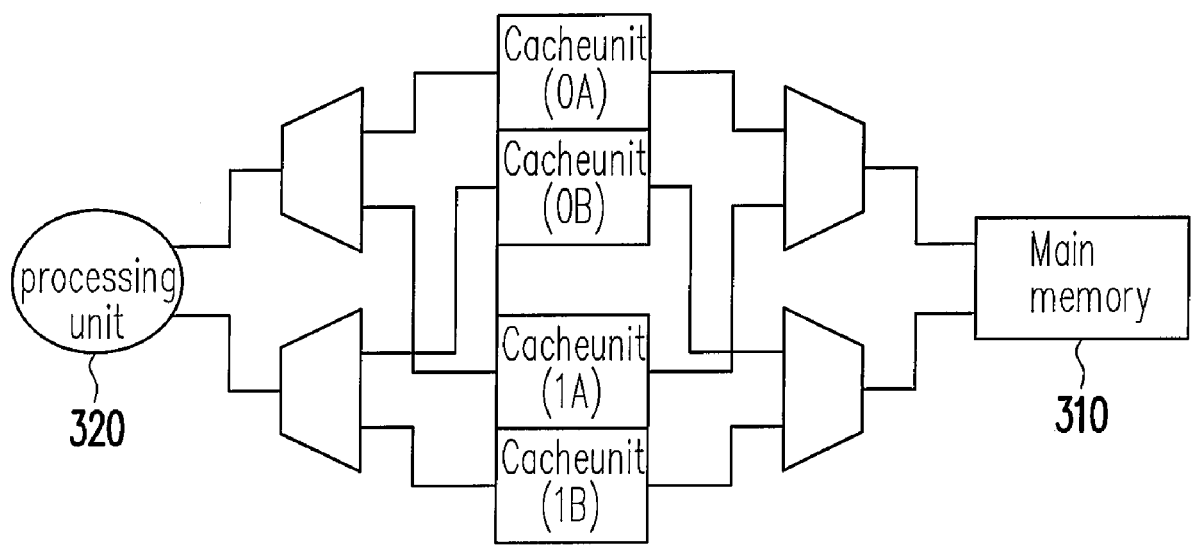
FIG. 3 is a conventional digital signal processing architecture with a cache.
Figure 4:
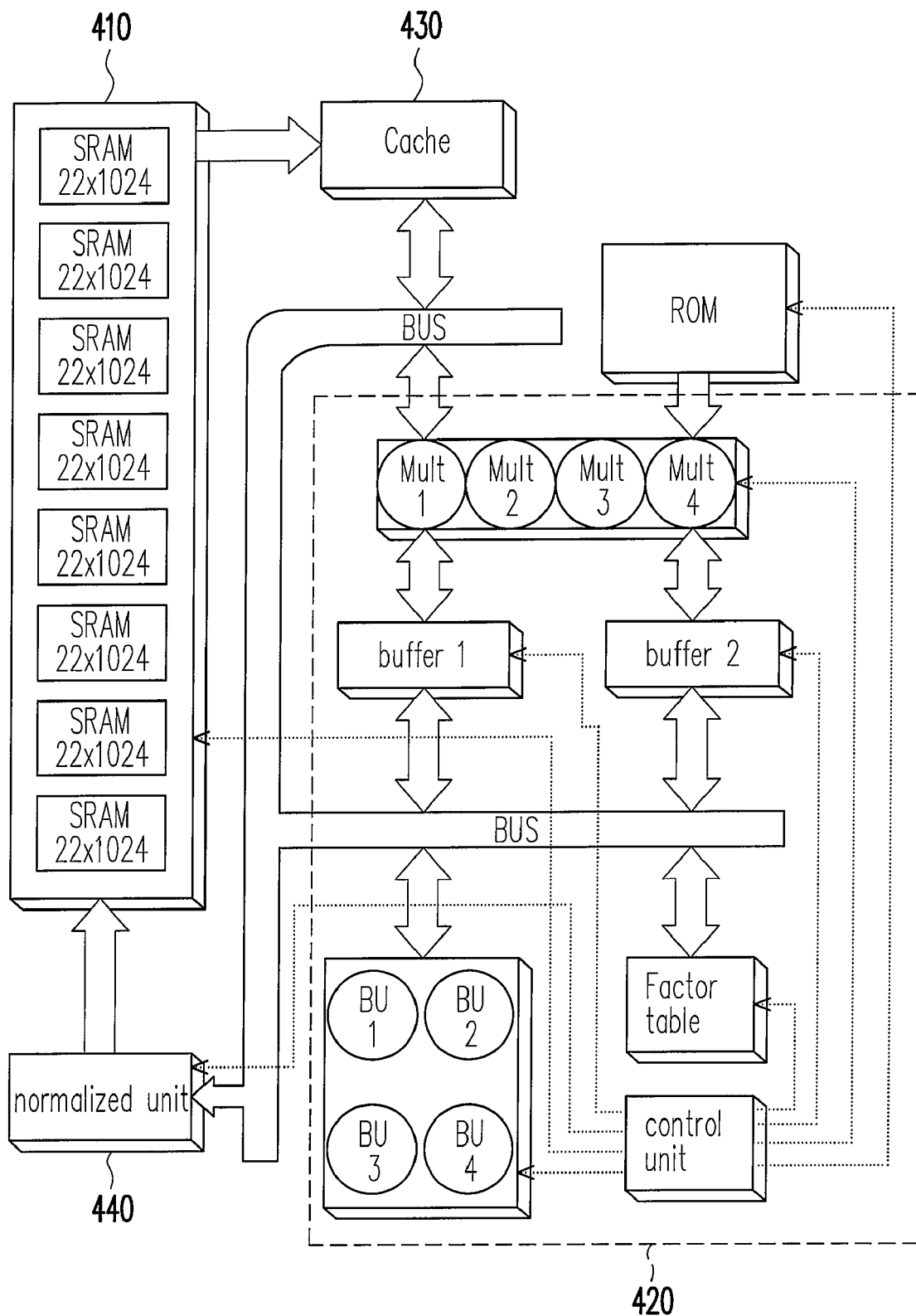
FIG. 4 is a digital signal processing apparatus with a radix-8 FFT processing unit and a cache.
Figure 5:
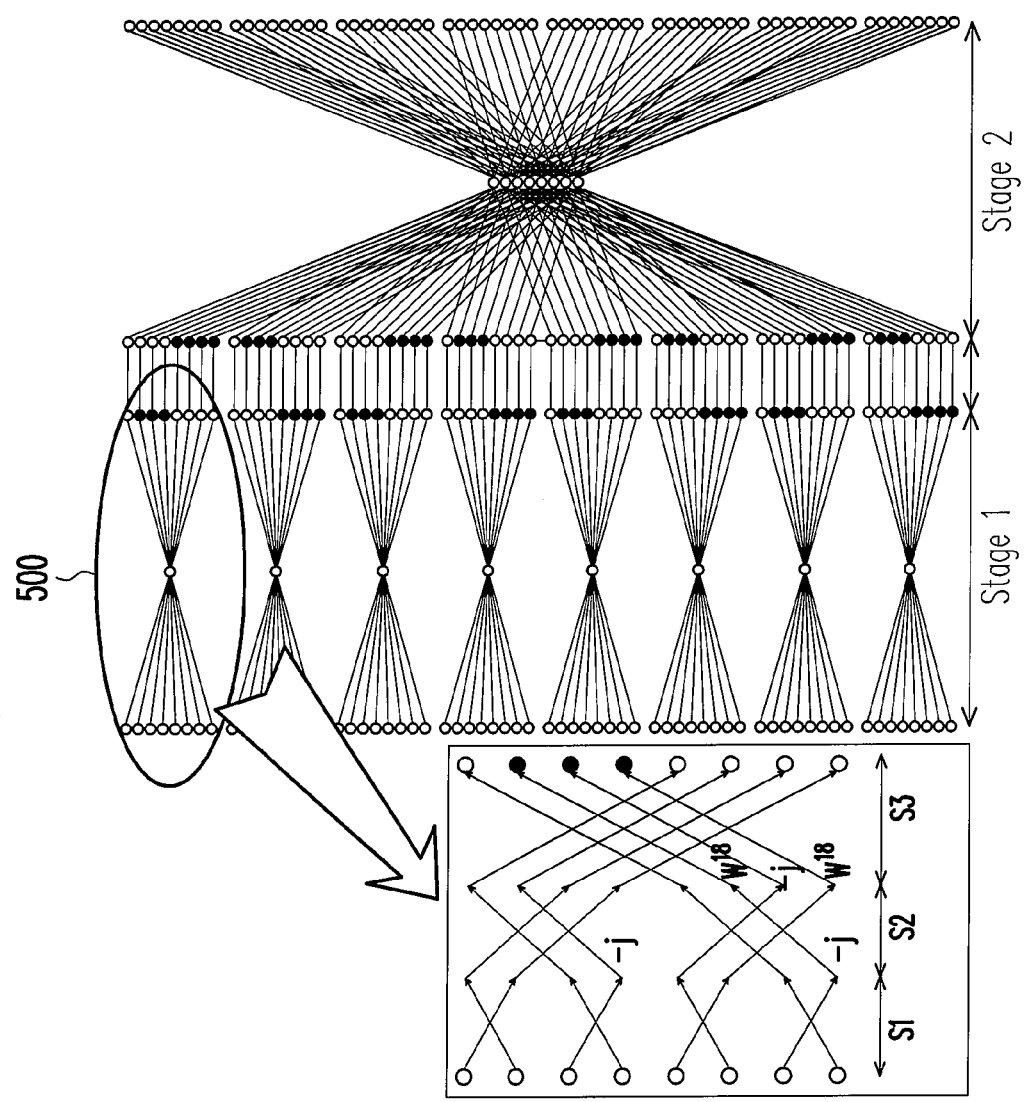
FIG. 5 is a signal flow graph of a 64-point FFT and a radix-8 butterfly operation.

Since in this embodiment the processing unit 720 is a processor for a radix-8 FFT operation, the operating units 721 in the processing unit 720 provide 4 butterfly operating units BU1 to BU4 for performing the radix-2 FFT operation. With the controlling of a twiddle factor generator 722, the operating unit 721 can perform a 3-step butterfly operation to the received 8 data, i.e., a radix-$2^3$ FFT operation (the signal flow graph is shown in FIG. 5).

For example, referring to FIGS. 7, 5, 6A, and 6B, when the processing unit 720 carries out Stage 1, the cache 730 outputs the data to the processing unit 720 column by column. For example, the cache 730 outputs the 1st column (i.e., the 0th to 7th data) to the processing unit 720 to perform the radix-8 butterfly operation, and so forth. Each time after completing one radix-8 butterfly operation, the processing unit 720 writes the results back to the corresponding places of the cache 730, to update the data stored in the cache 730. Then, when the processing unit 720 carries out Stage 2, the cache 730 outputs the data to the processing unit 720 row by row, referring to FIG. 6B. For example, the cache 730 outputs the 1st row (i.e., the 0th, 8th, 16th, 24th, 32nd, 40th, 48th, 56th data) to the processing unit 720 to perform the 1st radix-8 butterfly operation in Stage 2, and then the cache 730 outputs the 2nd row (i.e., the 1st, 9th, 17th, 25th, 33rd, 41st, 49th, 57th data) to the processing unit 720 to perform the 2nd radix-8 butterfly operation in Stage 2, and so forth. Thus, the operation of configuration 2 has been completed.

Therefore, 64 data is read from the main memory 710 and stored in the cache 730 at a time, the processing unit 720 can achieve the 64-point FFT operation according to the above method. After the processing unit 720 has completed the 64-point FFT operation, the calculation results stored in the cache 730 are written back to the main memory 710, thus completing the operation of configuration 3. Then the operation of configuration 1 is performed repeatedly, i.e., another group of data (64 data) is read from the main memory 710 and stored in the cache 730. The processing unit 720 may repeat the above operation method to perform another 64-point FFT operation. If there are much more points for the data to be calculated (for example, DVB-T communication system requires an 8192-point FFT operation), the efficiency of the digital signal processing apparatus 700 in this embodiment can be remarkably promoted.

Figure 9A:
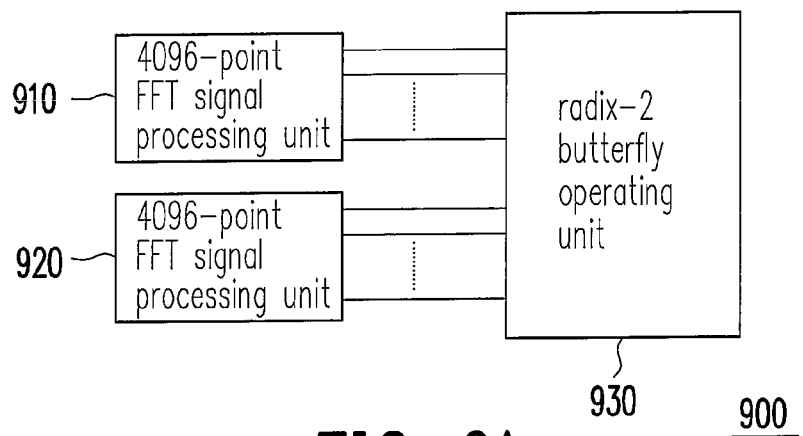
FIG. 9A is an embodiment of a DVB-T communication system requiring an 8192-point FFT operation according to the present invention.
Figure 9B:
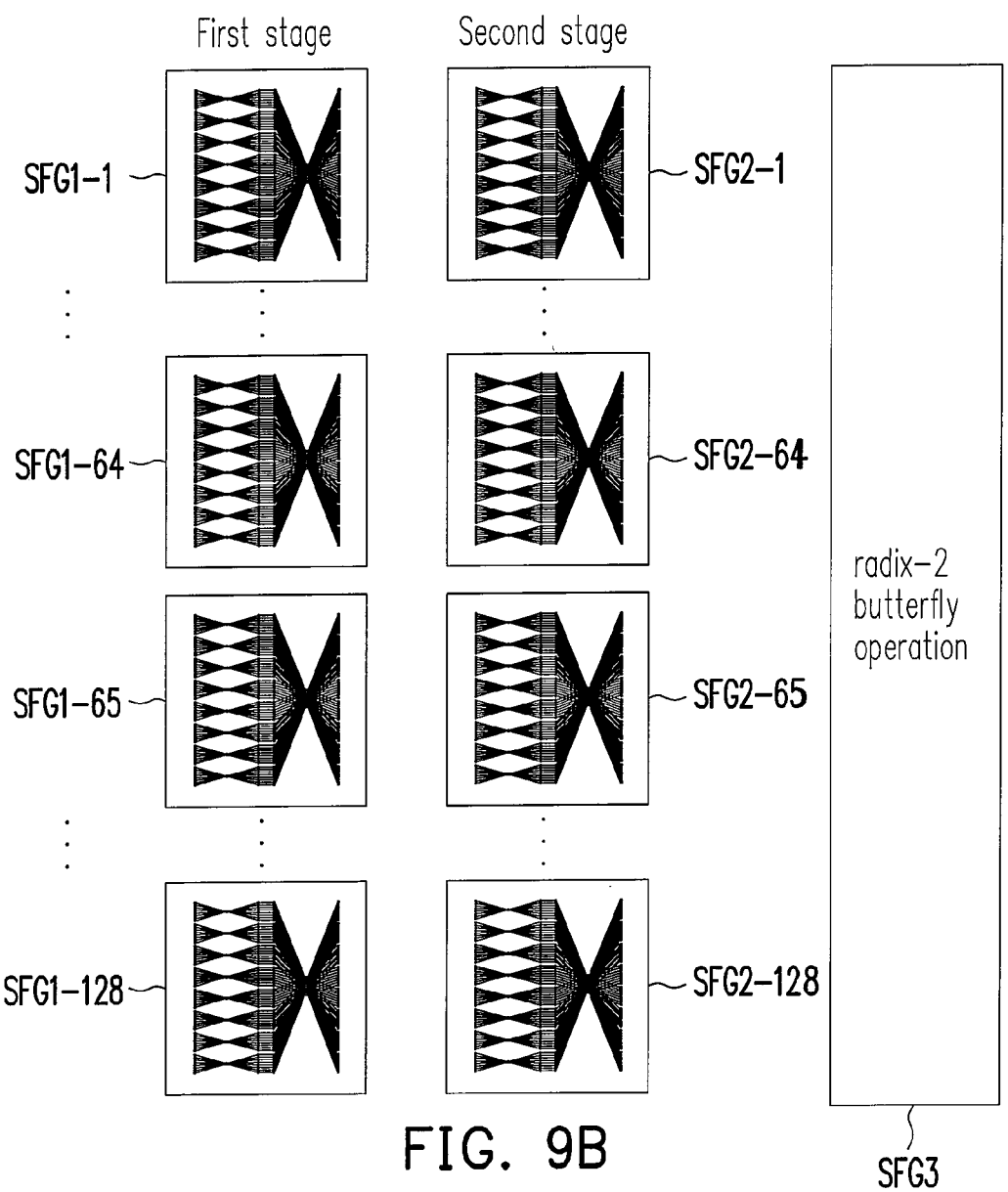
FIG. 9B is a signal flow graph of FIG. 9A according to the embodiment of the present invention.

FIG. 9A is an embodiment of a DVB-T communication system requiring an 8192-point FFT operation according to the present invention. FIG. 9B is the signal flow graph of FIG. 9A according to this embodiment of the present invention. The 8192-point data for the FFT operation is divided into 2 groups (4096 points for each) 910 and 920, and both groups are processed respectively and then combined through a radix-2 butterfly operation.

Referring to FIGS. 7, 9A, and 9B, the 8192-point FFT of FIG. 9A can be achieved with one digital signal processing apparatus 700. According to the embodiment of the present invention, the signal flow graph can be divided into 256's 64-point data blocks SFG1-1 to SFG2-128 of the first and second stages, and combined through a radix-2 butterfly operation in the third stage SFG3. At first, the digital signal processing apparatus 700 sequentially carries out the 64-point butterfly operations SFG1-1 to SFG1-128, and then processes the blocks of data SFG2-1 to SFG2-128. Finally, the data processing in the third stage is performed without using the cache 730, but the data is accessed between the main memory 710 and the processing unit 720, that is, the memory 710 directly moves 8 data to the processing unit 720. The butterfly operation of one step is performed with four butterfly operating units BU1 to BU4. Then, the 8 results are directly in-place written to the memory 710, and the next 8 data are moved to be processed in a similar way. After the radix-2 butterfly operation combination has been completed, the entire 8192-point FFT operation is completed as well.

Figure 9C:
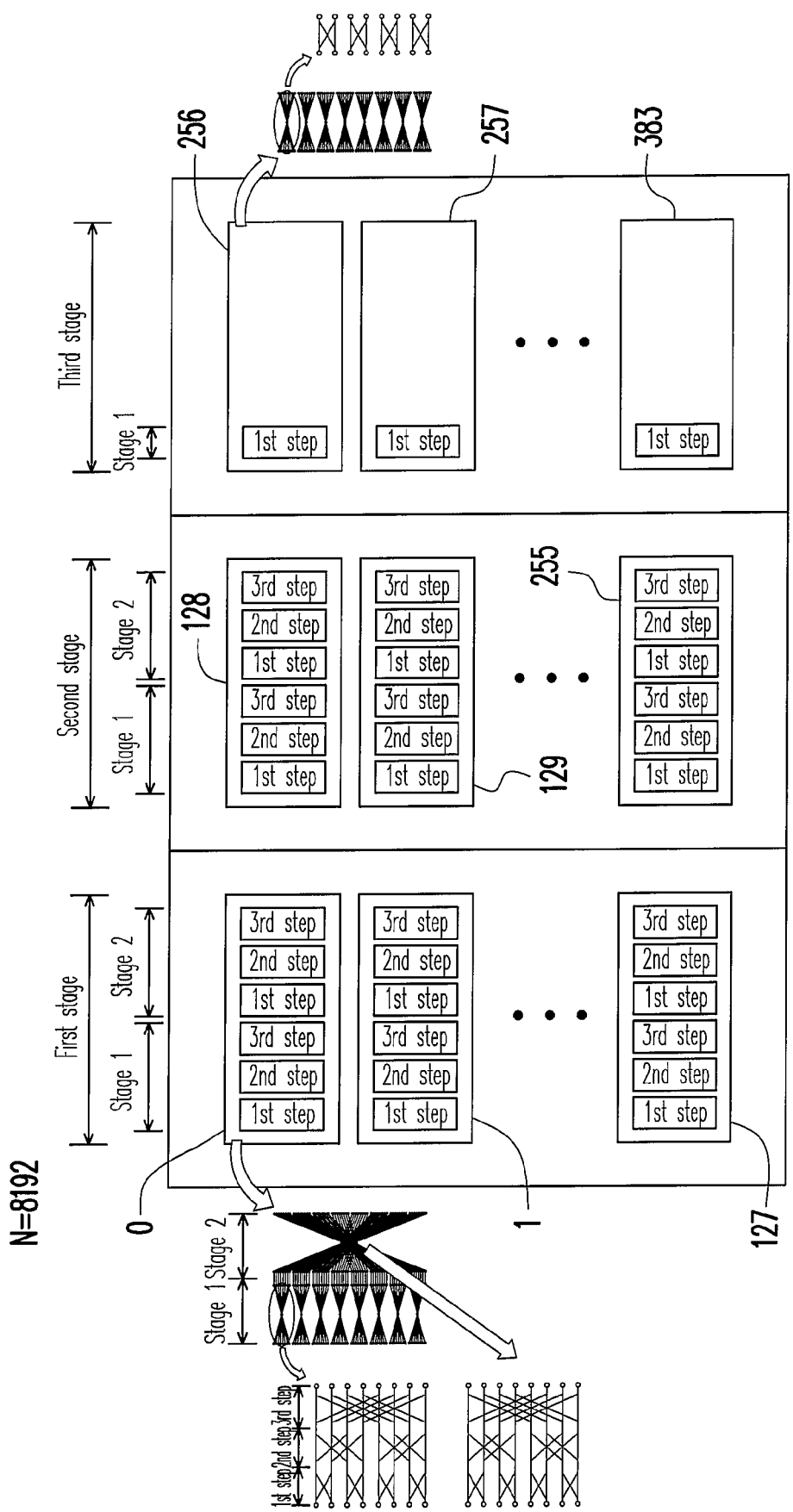
FIGS. 9C-9E are the signal flow graphs (SFG) of 8192-point, 2048-point, 4096-point FFT operations performed in an alternative way according to the present invention.

FIG. 9C is a signal flow graph (SFG) of the 8192-point FFT operation performed in an alternative way according to the present invention. The blocks 0-127 indicate the 64-point butterfly operations SFG1-1 to SFG1-128 performed through the digital signal processing apparatus 700; the blocks 128-255 indicate performing the butterfly operations SFG2-1 to SFG2-128 respectively; and the blocks 256-383 indicate performing the butterfly operations SFG3-1 to SFG3-128 respectively. The operation should be performed in the following sequences: first, performing the first stage (blocks 0-127); then performing the second stage (blocks 128-255); and finally performing the third stage (blocks 256-383). In blocks 0-255, the butterfly operations of Stage 1 and Stage 2 are performed respectively, i.e., performing operations to the columns and rows of the cache 730. In each stage, the butterfly operations of the 1st, 2nd, and 3rd steps are included, as shown in FIG. 9C. The processing in blocks 256-383 is different from that of FIG. 9B, but the main memory also carries out the butterfly operation through the cache 730 and the processing unit 720, that is, 64 data are moved from the main memory 710 to be sequentially written to the cache 730 in the column sequence, and then the data are read by the processing unit 720 from the cache 730 in the column sequence with only one operation of Stage 1. The Stage 1 only includes the 1st step butterfly operation. After the operation has been completed, the 64 data of the cache 730 are sequentially in-place written back to the memory 710 in the column sequence. Then, another 64 data is processed similarly, and the above operations for even-numbered or odd-numbered blocks are the same.

Figure 9D:
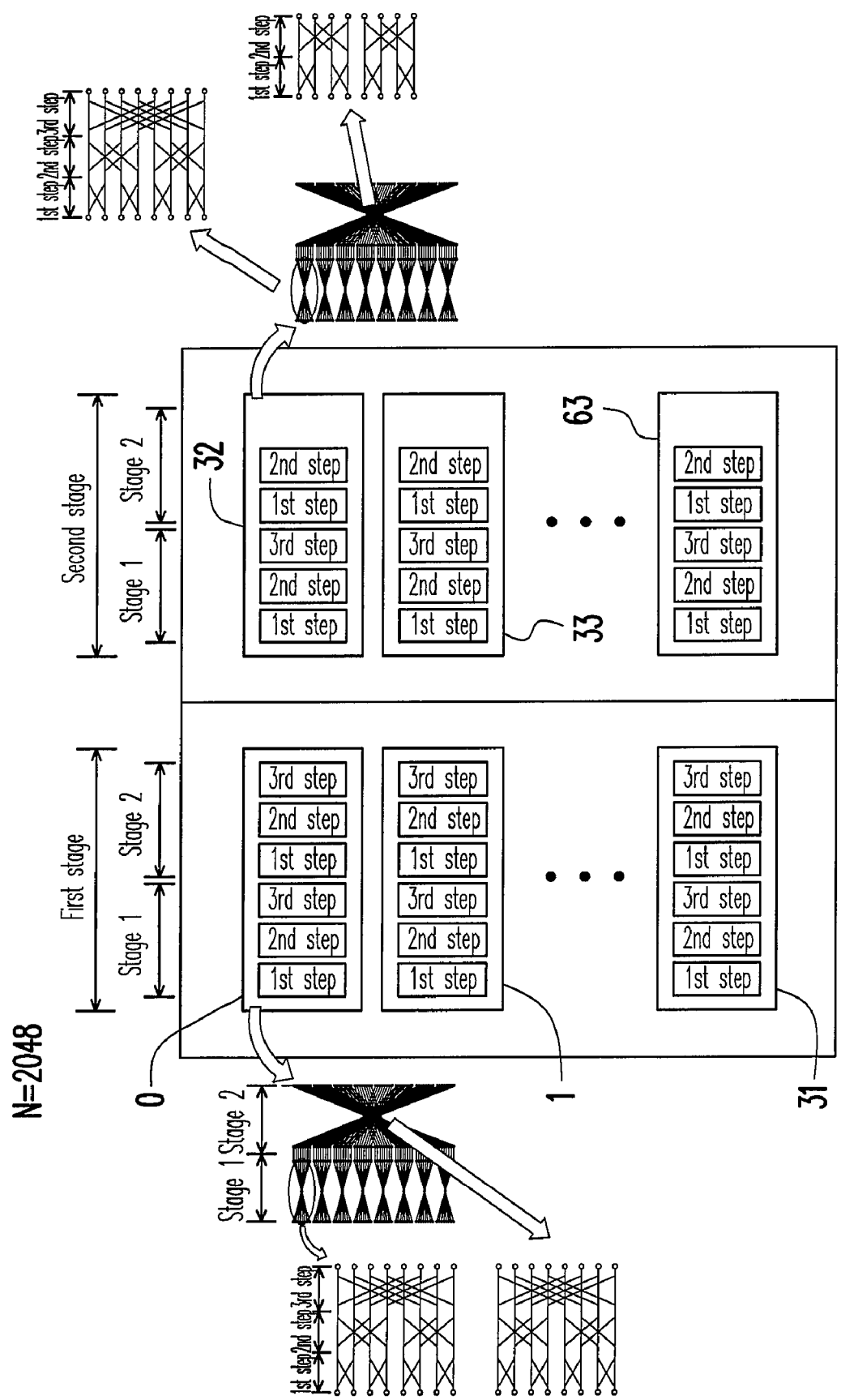
Figure 9E:
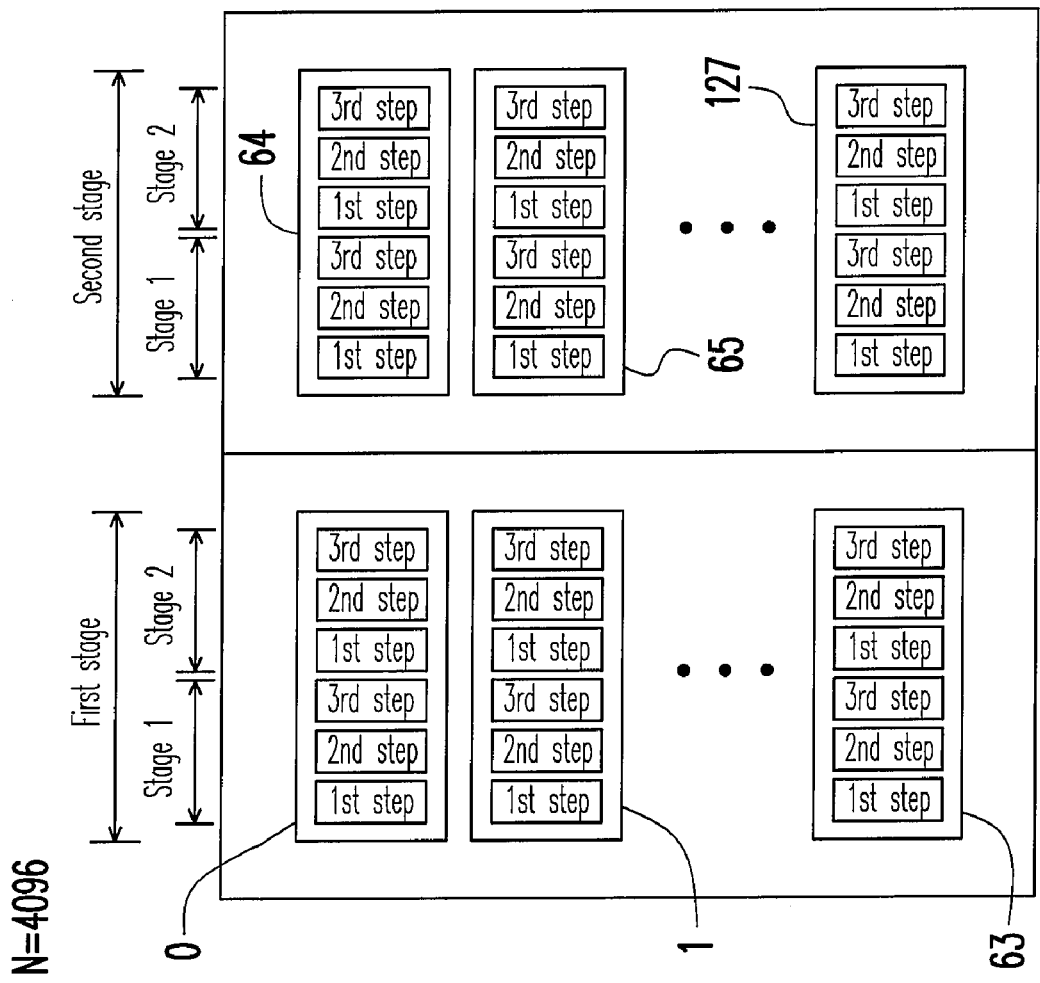

FIG. 9E is the signal flow graph of a 4096-point FFT operation according to the present invention. The blocks 0-63 and the blocks 64-127 indicate the 64-point butterfly operations SFG1-1 to SFG1-64 and SFG2-1 to SFG2-64 performed through the digital signal processing apparatus 700 respectively. The operation should be performed in the following sequences: first performing the first stage (blocks 0-63); and then performing the second stage (blocks 64-127). FIG. 9D is the signal flow graph (SFG) of a 2048-point FFT operation according to the present invention. The blocks 0-31 and 32-63 indicate the 64-point butterfly operations SFG1-1 to SFG1-32 and SFG2-1 to SFG2-32 performed through the digital signal processing apparatus 700 respectively. The operation should be performed in the following sequence: first performing the first stage (blocks 0-31); and then performing the second stage (blocks 32-63). The butterfly operations SFG1-1 to SFG1-32 are similar to that of the above embodiment, and thus their descriptions are omitted herein. The Stage 1 operation of the SFG2-1 to SFG2-32 is the same as that of the SFG1-1 to SFG1-32, but the Stage 2 operation of the SFG2-1 to SFG2-32 only requires a two-step butterfly operation.

In summary, the 2048-point, 4096-point, 8192-point FFT operation performed according to the present invention is summarized in Table 1.

TABLE 1 operation table of 2048-point, 4096-point, and 8192-point FFTs

|  |  | Configuration 1 | Configuration 2 | Configuration 3 |
|---|---|---|---|---|
| 2048-point the first stage | Even-numbered block | Write to the cache in column direction | 1. a 3-step butterfly operation in column direction 2. a 3-step butterfly operation in row direction | Write back to the main memory in row direction |
|  | Odd-numbered block | Write to the cache in row direction | 1. a 3-step butterfly operation in row direction 2. a 3-step butterfly operation in column direction | Write back to the main memory in column direction |
| 2048-point the second stage | Even-numbered block | Write to the cache in column direction | 1. a 3-step butterfly operation in column direction 2. a 2-step butterfly operation in row direction | Write back to the main memory in row direction |
|  | Odd-numbered block | Write to the cache in row direction | 1. a 3-step butterfly operation in row direction 2. 2-step butterfly operation in column direction | Write back to the main memory in column direction |
| 4096-point the first, second stages | Even-numbered block | Write to the cache in column direction | 1. a 3-step butterfly operation in column direction 2. a 3-step butterfly operation in row direction | Write back to the main memory in row direction |
|  | Odd-numbered block | Write to the cache in row direction | 1. a 3-step butterfly operation in row direction 2. a 3-step butterfly operation in column direction | Write back to the main memory in column direction |
| 8192-point the first, second stages | Even numbered block | Write to the cache in column direction | 1. a 3-step butterfly operation in cloumn direction 2. a 3-step butterfly operation in row direction | Write back to the main memory in row direction |
|  | Odd-numbered block | Write to the cache in row direction | 1. a 3-step butterfly operation in row direction 2. a 3-step butterfly operation in column direction | Write back to the main memory in column direction |
| 8192-point the third stage | Even-numbered block | Write to the cache in column direction | a 1-step butterfly operation in column direction | Write back to the main memory in column direction |
|  | Odd-numbered block | Write to the cache in column direction | a 1-step butterfly operation in column direction | Write back to the main memory in column direction |

Compared with the above first conventional art, a cache is employed in this embodiment, thus, the times of data accessing for the main memory can be significantly reduced, and the efficiency is promoted accordingly. Compared with the above second conventional art, only a single cache is used in this embodiment so that the control mechanism is simplified; power consumption is reduced; circuit area is saved; and manufacturing costs are reduced. Compared with the above third conventional art, there is no common bus among the processing unit, the cache, and the main memory in this embodiment so that the routing complexity in physical manufacturing is greatly reduced; the control mechanism is also simplified; and manufacturing costs are relatively reduced.

Another embodiment is taken as an example to clearly illustrate the present invention. FIG. 10 is an embodiment of another digital signal processing apparatus according to the present invention. Referring to FIG. 10, a digital signal processing apparatus 1000 includes a main memory 1010, a processing unit 1020, a cache 1030, a first rotate buffer 1040, and a third rotate buffer 1050. The main memory 1010 includes at least R memory banks for storing a plurality of data representing the digital signal, where R is an integer (R is, e.g., equal to 8 herein). Herein, the processing unit 1020 and the main memory 1010 are similar to the processing unit 720 and the main memory 710 of FIG. 7 respectively, and therefore, the descriptions are omitted herein.

The cache 1030 is coupled between the main memory 1010 and the processing unit 1020. The cache 1030 includes at least R×R cache units for storing part of data of the main memory 1010 to provide them to the processing unit 1020. The cache 1030 also temporarily stores the results of the processing unit 1020. The rotate buffer 1040 is coupled between the main memory 1010 and the cache 1030 for buffering and rotating the data outputted from each memory bank of the main memory 1010, so as to write them to the cache 1030. The operation of the rotate buffer 1040 can be made with reference to the illustration of the rotate buffer 741 in FIG. 7.

The rotate buffer 1050 couples between the main memory 1010 and the cache 1030, and couples between the processing unit 1020 and the cache 1030. The rotate buffer 1050 buffers and rotates the data output from part of the cache units of the cache 1030, so as to write them back to the corresponding memory banks of the main memory 1010 respectively. The rotate buffer 1050 also temporarily stores the output of the cache 1030 to provide the data to the processing unit 1020, and temporarily stores the results of the processing unit 1020, so as to write them back to the corresponding places in the cache 1030. The operation of the rotate buffer 1050 can be made with reference to the illustration of the rotate buffer 742 and the data buffer 750 in FIG. 7.

FIG. 11 is an embodiment of another digital signal processing apparatus according to the present invention. Referring to FIG. 11, a digital signal processing apparatus 1100 includes a main memory 1110, a processing unit 1120, a cache 1130, a first rotate buffer 1140, a data buffer 1150, and a fourth rotate buffer 1160. In this embodiment, the main memory 1110, the processing unit 1120, the cache 1130, the first rotate buffer 1140, and the data buffer 1150 are, for example, similar to the main memory 710, the processing unit 720, the cache 730, the rotate buffer 741, and the data buffer 750 in FIG. 7, and therefore, the descriptions of the same parts are omitted herein.

After completing Stage 1, the processing unit 1120 writes the results back to the cache 1130 via the data buffer 1150. When performing Stage 2, the processing unit 1120 sends the results to the rotate buffer 1160 without writing them back to the cache 1130 each time, after one radix-8 butterfly operation has been completed.

The rotate buffer 1160 couples between the main memory 1110 and the processing unit 1120. The rotate buffer 1160 buffers and rotates the results outputted from the processing unit 1120 (the rotation is similar to that of the rotate buffer 742 in FIG. 7), so as to write them back to the corresponding memory banks in the main memory 1110 respectively.

Figure 12:
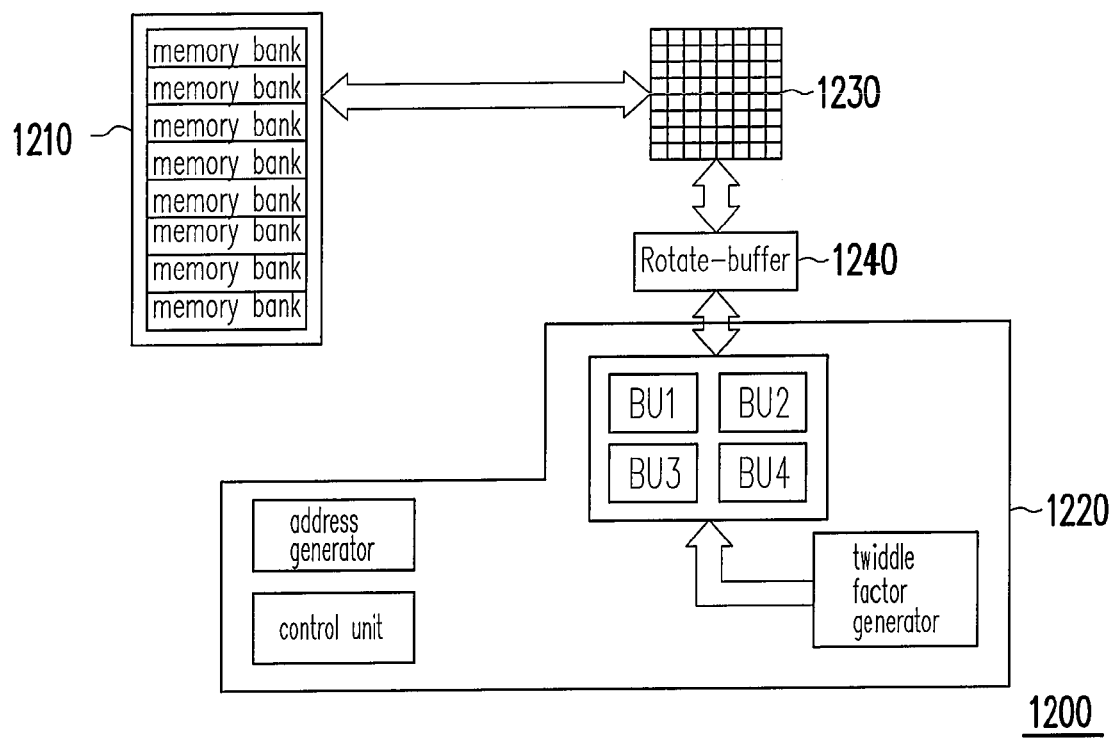

FIG. 12 is another embodiment of a digital signal processing apparatus according to the present invention. Referring to FIG. 12, a digital signal processing apparatus 1200 includes a main memory 1210, a processing unit 1220, a cache 1230, and a rotate buffer 1240. The main memory 1210, the processing unit 1220, and the cache 1230 are, for example, similar to the main memory 710, the processing unit 720, and the cache 730 in FIG. 7, and therefore, the descriptions of the same parts are omitted herein.

In this embodiment, the data structure of the cache 1230 is different from that of the above embodiment. There are no rotate buffers disposed between the cache 1230 and the main memory 1210, such that the sequence of the data stored in the cache 1230 depends on the sequence of the data output from the main memory 1210.

The rotate buffer 1240 couples between the processing unit 1220 and the cache 1230. Since the sequence of R data output from the cache 1230 has not been rotated, the R data outputted from part of the cache units of the cache 1230 should be buffered and rotated by the rotate buffer 1240, and adjusted to a correct sequence, and then the data is provided to the processing unit 1220. After the processing unit 1220 has completed the operation, R operation results are outputted to the rotate buffer 1240. After adjusting the R operation results output from the processing unit 1220 to the original sequence, the rotate buffer 1240 writes them to the corresponding cache units of the cache 1230 to update the data. After the processing unit 1220 completes Stage 1 and Stage 2 operations of the R×R-point FFT operation, the cache 1230 writes the stored R×R-point operation results back to the main memory 1210.

Figure 13:
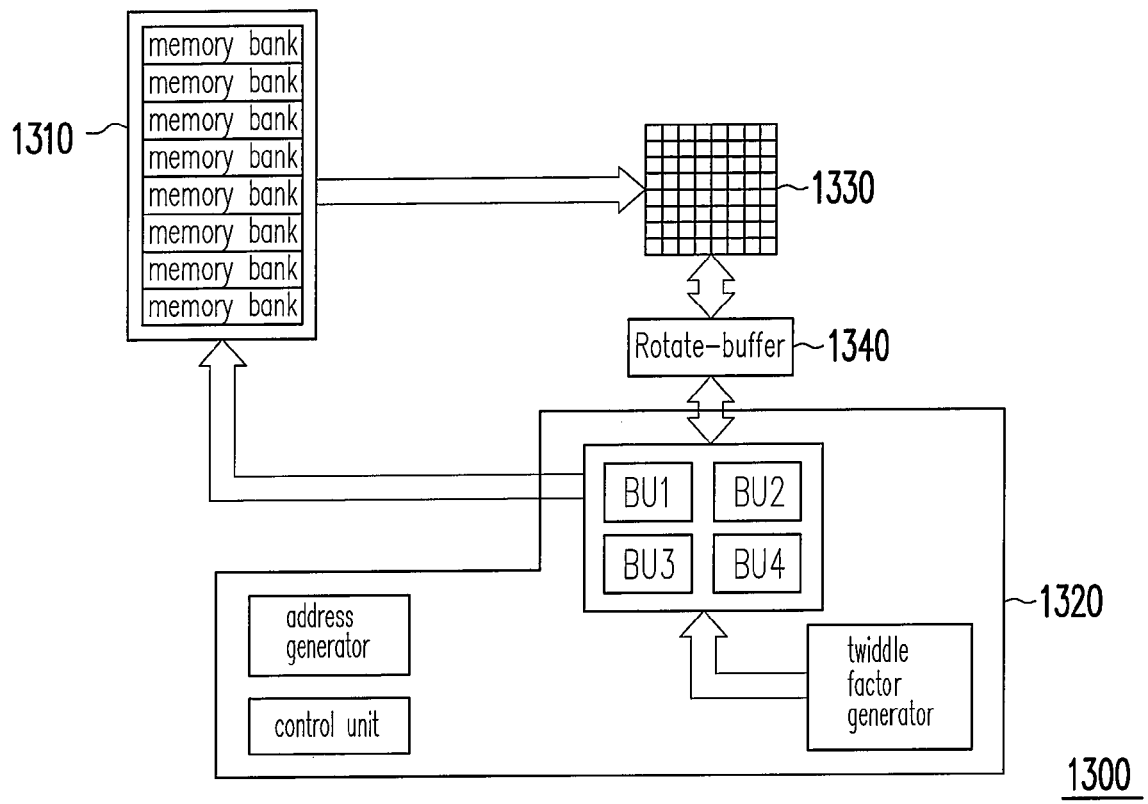

FIG. 13 is another embodiment of a digital signal processing apparatus according to the present invention. Referring to FIG. 13, a digital signal processing apparatus 1300 includes a main memory 1310, a processing unit 1320, a cache 1330, and a rotate buffer 1340. The main memory 1310, the processing unit 1320, the cache 1330, and the rotate buffer 1340 are, for example, similar to the main memory 1210, the processing unit 1220, the cache 1230, and the rotate buffer 1240 in FIG. 12, and therefore the descriptions of the same parts are omitted herein.

The processing unit 1320 is further coupled to the main memory 1310. As described in the above embodiment, after completing Stage 1, the processing unit 1320 writes the results back to the cache 1330 via the rotate buffer 1340. When performing Stage 2, the processing unit 1320 directly writes the results back to the corresponding memory banks in the main memory 1310 without writing them back to the cache 1330, each time after completing one radix-8 butterfly operation.

In summary, the digital signal processing apparatus of the present invention employs an algorithm suitable for the radix-R FFT processing unit, the R×R cache units, R memory banks, and the rotate buffer is disposed between the processing unit and the cache, between the cache and the main memory, and/or between the main memory and the processing unit. Therefore, it is suitable for performing FFT operations of variable power-of-2 lengths, and the calculation complexity is low, and the required latency-specified time can meet the requirements of various communication standards. In addition, the routing complexity in physical manufacturing is reduced due to the use of a rotate buffer in the present invention. Besides, the present invention also has many advantages, such as lower power consumption, higher efficiency, and fewer caches.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital signal processing apparatus, comprising:
   a main memory, comprising at least R memory banks for storing a plurality of data of digital signal, where R is an integer;
   a processing unit, for performing Fast Fourier Transformation (FFT) operation with variable power-of-2 lengths to the data of the main memory;
   a cache, comprising at least R×R cache units for storing part of the data of the main memory to provide to the processing unit and temporarily storing the operation results of the processing unit; and
   a rotate buffer unit, coupled to the main memory and the cache, wherein the rotate buffer unit is capable of buffering and rotating the data outputted from the memory banks to write to the cache, and buffering and rotating the data outputted from part of the cache units to respectively write back to the corresponding memory banks at the same time in response to controlling and addressing for the processing unit,
   wherein there is no common bus among the main memory, the cache and the processing unit due to the rotate buffer unit, only a single cache is used by the digital signal processing apparatus, and each time after R data in the cache are written back to the main memory, R new data in the main memory are moved to replace the R data in the cache, until the cache is fully updated.

2. The digital signal processing apparatus as claimed in claim 1, wherein the memory banks are either one of single-port memories and dual-port memories.

3. The digital signal processing apparatus as claimed in claim 1, wherein the processing unit is a processor for a radix-R FFT operation.

4. The digital signal processing apparatus as claimed in claim 1, wherein the rotate buffer unit comprises:
   a first rotate buffer, coupled between the main memory and the cache, for buffering and rotating the data outputted from the memory banks to write to the cache; and
   a second rotate buffer, coupled between the main memory and the cache, for buffering and rotating the data outputted from part of the cache units to respectively write back to the corresponding memory banks.

5. The digital signal processing apparatus as claimed in claim 4, wherein the first rotate buffer and the second rotate buffer rotate the data towards left direction and right direction respectively.

6. The digital signal processing apparatus as claimed in claim 4, further comprising:
   a data buffer, coupled between the processing unit and the cache, for temporarily storing the data outputted from the cache to provide to the processing unit and temporarily storing the operation results of the processing unit to write back to the cache.

7. The digital signal processing apparatus as claimed in claim 1, wherein the rotate buffer unit is further coupled to the processing unit, and the rotate buffer unit comprises:
   a first rotate buffer, coupled between the main memory and the cache, for buffering and rotating the data outputted from the memory banks to write to the cache; and
   a second rotate buffer, coupled between the main memory and the cache and coupled between the processing unit and the cache, for buffering and rotating the data outputted from part of the cache units in the cache to write back to the corresponding memory banks respectively, temporarily storing the data outputted from the cache to provide to the processing unit, and temporarily storing the operation results of the processing unit to write back to the cache.

8. The digital signal processing apparatus as claimed in claim 7, wherein the first rotate buffer and the second rotate buffer rotate the data towards left direction and right direction respectively.

9. The digital signal processing apparatus as claimed in claim 1, wherein the rotate buffer unit is further coupled to the processing unit, and the rotate buffer unit comprises:
   a first rotate buffer, coupled between the main memory and the cache, for buffering and rotating the data outputted from the memory banks to write to the cache; and
   a second rotate buffer, coupled between the main memory and the processing unit, for buffering and rotating the operation results outputted from the processing unit to respectively write back to the corresponding memory banks.

10. The digital signal processing apparatus as claimed in claim 9, further comprising:
    a data buffer, coupled between the processing unit and the cache, for temporarily storing the data outputted from the cache to provide to the processing unit, and temporarily storing the operation results of the processing unit to write back to the cache.

11. The digital signal processing apparatus as claimed in claim 9, wherein the first rotate buffer and the second rotate buffer rotate the data towards left direction and right direction respectively.

12. A digital signal processing apparatus, comprising:
    a main memory, comprising at least R memory banks for storing a plurality of data of digital signal, where R is an integer;
    a processing unit, for performing Fast Fourier Transformation (FFT) operation with variable power-of-2 lengths to the data of the main memory;
    a cache, coupled to the main memory the cache comprising at least R×R cache units for storing part of data of the main memory to provide to the processing unit; and
    a rotate buffer, coupled between the processing unit and the cache, for buffering and rotating the data outputted from part of the cache units to provide to the processing unit,
    wherein the processing unit is further coupled to the main memory for writing the operation results from the processing unit back to the corresponding memory banks respectively; and
    wherein there is no common bus among the main memory, the cache and the processing unit due to the rotate buffer, only a single cache is used by the digital signal processing apparatus, and each time after R data in the cache are written back to the main memory, R new data in the main memory are moved to replace the R data in the cache, until the cache is fully updated.

13. The digital signal processing apparatus as claimed in claim 12, wherein the memory banks are either one of single-port memories and dual-port memories.

14. The digital signal processing apparatus as claimed in claim 12, wherein the rotate buffer rotates the data towards left direction and right direction respectively.

* * * * *